No. 808,854.

PATENTED JAN. 2, 1906.

W. MAYER.
AMMUNITION PACKAGE.
APPLICATION FILED FEB. 20, 1905.

Witnesses
J. M. Stynkoop.
J. H. White.

Inventor
Wilhelm Mayer
by Knight Bros
attys.

UNITED STATES PATENT OFFICE.

WILHELM MAYER, OF RÜTTENSCHEID, NEAR ESSEN-ON-THE-RUHR, GERMANY, ASSIGNOR TO FRIED. KRUPP, AKTIENGESELLSCHAFT, OF ESSEN-ON-THE-RUHR, GERMANY.

AMMUNITION-PACKAGE.

No. 808,854.  Specification of Letters Patent.  Patented Jan. 2, 1906.

Application filed February 20, 1905. Serial No. 246,632.

*To all whom it may concern:*

Be it known that I, WILHELM MAYER, a subject of the German Emperor, and a resident of Rüttenscheid, near Essen-on-the-Ruhr, Germany, have invented certain new and useful Improvements in Ammunition-Packages, of which the following is a specification.

The present invention relates to ammunition-packages provided with seats for the projectiles or cartridges; and the object of the invention is to provide improved elastic holding means for the ammunition in the package. The said object is attained in accordance with the present invention by providing an elastic gasket in position to receive and formed with a supporting-face conforming to the point of the projectile.

Figure 1:
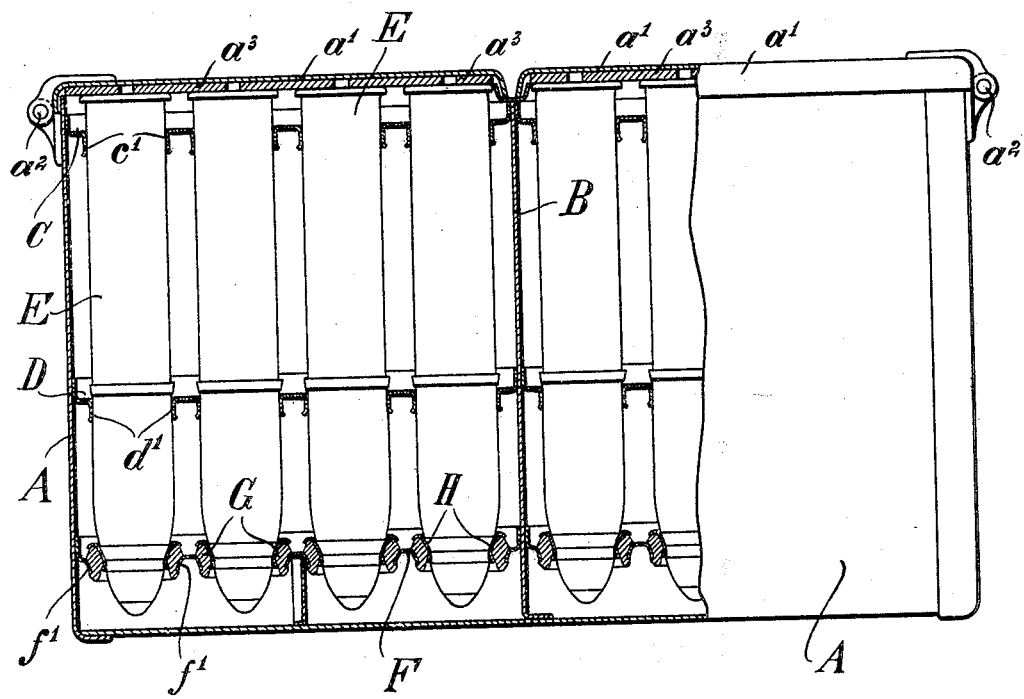
Figure 2:
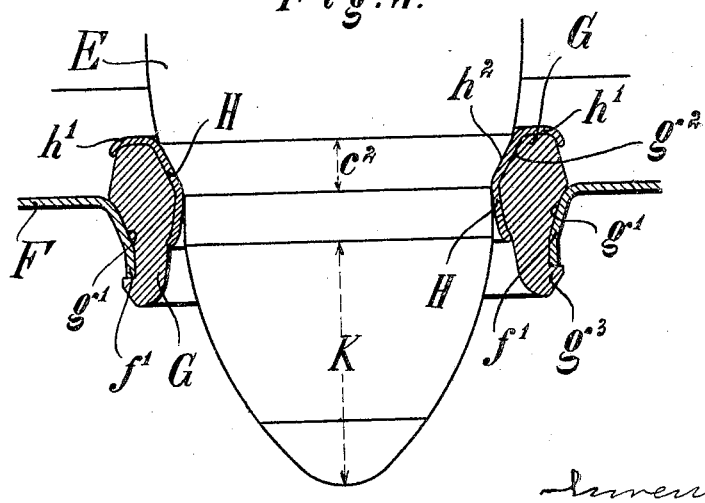

In the accompanying drawings an embodiment of the ammunition-package suitable for fixed ammunition is shown by way of example, Figure 1 showing the box partly in front elevation and partly in vertical section, and Fig. 2 being a detail view on an enlarged scale.

The ammunition-package comprises a box or other receptacle A, centrally divided by a vertical partition B, with each compartment thus formed closed by a cover $a'$, connected to the box by hinges $a^2$ and provided on its inner face with cushioning-plates $a^3$, of leather, felt, or the like, horizontal partitions C D, formed with pressed cylindrical bearings $c'$ and $d'$ for the respective cartridges, and a horizontal partition F near the bottom parallel to partitions C D and formed with downwardly-tapering pressed seats $f'$ for the respective cartridges. The bearings $c' d'$ and the seat $f'$ for each cartridge are coaxial. Fitted in each of the seats $f'$ is a gasket G, of elastic material, (rubber, cork, or the like,) which provides a cushion-seat for the end of the projectile. By reason of the elasticity and the shape of the gaskets G they are held in position in the seats $f'$ without special securing means, and they may therefore be readily inserted and removed. For these purposes each gasket is formed with a surface $g'$, corresponding to the inner wall of the seat $f'$, and the lower part $g^3$ thereof overlaps the lower edge of the seat $f'$. These gaskets are provided with metallic linings H, which serve the purpose of protecting them against damage and for distributing the pressure of the cartridge uniformly throughout the gaskets. The linings H are provided only on the upper and the middle parts of the gaskets, so that when a gasket is inserted into or removed from the seat $f'$ the lower part of the gasket can compress in passing the lower edge of the seat $f'$ beneath which the gasket engages by its annular shoulder $g^3$. The concavity of the lining and the corresponding convexity of the gasket, together with the elasticity of the latter, facilitate the assembling of these two parts and hold them together without special securing means. The gasket G and the lining H are provided with bearing-faces $g^2$ and $h^2$, Fig. 2, respectively, which are inclined relatively to the axis of the seat $f'$ and correspond to the bearing-face $c^2$ of the projectile-point which is inclined relatively to the longitudinal axis of the projectile. The lining H has a collar $h'$, projecting over and conforming to the upper end of gasket G. As shown in the drawings, the dimensions of the gasket G and its lining are so determined as to keep out of contact with the cap of the fuse K when the cartridge is placed in the box. The cushioned seat affords vertical as well as lateral support for the projectile and is situated at such a distance from the cover $a'$ that the closing of the cover causes the projectile to compress the ring G through the medium of the lining H, so that slight variations of length in the cartridges are of no consequence, a longer cartridge merely compressing the ring G more than a shorter cartridge, and when the cover $a'$ is locked the cartridges are firmly held between their elastic seats and the cover, so that shocks incurred during transportation or in handling cannot displace the cartridges in the package and the effect of such shocks is reduced by reason of being distributed over a comparatively great surface of the elastic ring G. Even though lateral shocks be very great the cartridges cannot be damaged and the projectiles cannot get loose in the cartridge-shells, because the intermediate portion D embraces the ammunition below the upper end of the projectile, and the weight of the projectile is thus sustained directly and not through the medium of the shell.

The cushioning parts G H may be suitably introduced into the seat $f'$ by first pressing the lining H by hand into the gasket G and then placing the lined gasket loosely on the upper edge of the seat $f'$ and finally forcing the cushion into engagement with the seat $f'$ by means of a cartridge. In thus forcing the cushion into position the shoulder $g^3$ of gasket G is folded toward the face $g'$, and the body of the gasket is compressed in the direction of its axis. In the further course of the insertion the bottom $g^3$ springs outward beneath the lower edge of the seat $f'$, and the parts assume the positions shown in the drawings, so that the gasket is held in the seat $f'$ through the convexity of face $g'$ and the shoulder $g^3$. It is evident that the ring G, with the lining H, can be easily removed by hand from the bearing $f'$, at which time the lower part of the ring is deflected inwardly to release it.

Having thus described my invention, what I claim as new is—

1. An ammunition-package constructed with a seat and having an elastic cushion in said seat conforming to the projectile to be inserted therein.

2. An ammunition-package comprising a suitable receptacle, bearings in said receptacle into which cartridges are introduced, seats in said receptacle, receiving the projectiles of said cartridges, and cushions in said seats.

3. An ammunition-package comprising a suitable receptacle, bearings in said receptacle into which cartridges are introduced, seats in said receptacle, receiving the projectiles of said cartridges, and cushions in said seats; said cushions being provided with metallic linings conforming to the portion of the projectile resting therein.

4. An ammunition-package comprising a suitable receptacle, bearings in said receptacle into which cartridges are introduced, seats in said receptacle, receiving the projectiles of said cartridges, and cushions in said seats; said cushions being formed to engage beneath portions of the seats to retain the cushions in position.

5. An ammunition-package comprising a suitable receptacle, bearings in said receptacle into which cartridges are introduced, seats in said receptacle, receiving the projectiles of said cartridges, and cushions in said seats; said cushions being provided with metallic linings conforming to the portion of the projectile resting therein and said cushions and linings being secured in relative position by concave and convex faces.

6. An ammunition-package comprising a suitable receptacle, bearings in said receptacle into which cartridges are introduced, seats in said receptacle, receiving the projectiles of said cartridges, and cushions in said seats; said cushions being provided with metallic linings conforming to the portion of the projectile resting therein and said linings being provided with collars overlapping the cushions.

7. In a package for ammunition, the combination with the receptacle; of a partition having seats pressed therein to receive the projectiles of the ammunition, and elastic gaskets fitted in said seats to cushion the projectiles, and formed with shoulders engaging beneath the lower edges of the seats to retain the gaskets in place.

8. In an ammunition-package, the combination of a receptacle, partitions therein formed respectively with bearings, through which the cartridges are inserted and seats in which the projectiles are supported; said seats being provided with cushions.

9. In an ammunition-package, the combination of a receptacle, upper, lower and intermediate partitions therein, bearings formed in the upper and intermediate partitions, through which cartridges are introduced, and cushioned seats formed in the lower partition, to receive the ends of the projectiles; the intermediate partition being located below the upper ends of the projectiles, to sustain said projectiles laterally.

10. An elastic non-metallic cushion for ammunition-packages constructed to receive the end of the projectile, and having a metallic lining conforming to a face of a projectile.

11. An elastic cushion for ammunition-packages constructed to receive the end of a projectile and having compressible means adapted to expand after compression and to engage a seat in an ammunition-package to hold it in place within a package.

12. An elastic cushion for ammunition-packages constructed to receive the end of a projectile and having an annular shoulder adapted to be compressed and to expand after compression to hold it within a seat in an ammunition-package.

13. An elastic cushion for ammunition-packages comprising a gasket constructed to receive the end of a projectile, having means for holding it within a seat in the package, and a metallic lining for the gasket, having a face conforming to an inclined face on a projectile, the lining being concave on one face and the gasket being convex on one of its faces to hold the two parts together.

The foregoing specification signed at Essen-on-the-Ruhr this 2d day of February, 1905.

WILHELM MAYER.

In presence of—
HARRY S. MEFFORD,
FREW PFUDEL.